Patented Feb. 2, 1943

2,309,871

UNITED STATES PATENT OFFICE 2,309,871

TREATMENT OF HYDROCARBON FLUIDS

Walter A. Schulze and Graham H. Short, Bartlesville, Okla., assignors to Phillips Petroleum Company, a corporation of Delaware No Drawing. Application August 31, 1940, Serial No. 355,090

7 Claims. (Cl. 196—27)

This invention relates to a process for removing carbonyl sulfide from hydrocarbon fluids, and to a specific reagent therefor. More specifically, this invention relates to the treatment of the so-called normally gaseous hydrocarbons from any source for the selective removal of carbonyl sulfide associated with said hydrocarbons.

Hydrocarbon fluids such as those obtained from crude petroleum oils and other sources usually contain varying amounts of deleterious sulfur compounds as impurities. The kinds and amounts of sulfur compounds occurring in any hydrocarbon fluid vary with the source material and with the method of manufacturing and processing said fluid. For example, thermal cracking operations have a tendency to convert hydrogen sulfide and open-chain sulfur compounds into cyclic compounds and to cause the combination of hydrogen sulfide with carbon compounds to form organic sulfur compounds including carbon sulfides.

Many of the sulfur compounds present in hydrocarbon fluids are detrimental to the processing or marketing of said fluids or of products derivable therefrom. Thus, there are conventional methods for removing hydrogen sulfide from hydrocarbon fluids and for converting mercaptans to less obnoxious form. Further, there are means known to the art for extracting mercaptans as such. However, carbonyl sulfide, a sulfur compound occurring in the lower-boiling products from the thermal processing of hydrocarbon oils does not belong in the classifications mentioned, and being relatively inert is not satisfactorily removed by conventional treating processes employed by the industry for the removal of hydrogen sulfide, mercaptans, and the like.

Carbonyl sulfide is presumably formed by reaction of hydrogen sulfide wtih oxides of carbon under the conditions of heat and pressure and exposed metal surfaces encountered in thermal cracking and reforming operations. The pure compound has a boiling point slightly lower than that of propane, although we have found its apparent boiling point is somewhat higher in hydrocarbon mixtures. Thus, the fractionation of cracking still gases to segregate a propane-butane fraction results in the inclusion of substantially all the carbonyl sulfide present within that fraction. Likewise a butane and heavier fraction containing only minor percentages of propane may contain appreciable amounts of carbonyl sulfide.

The necessity for selectively removing carbonyl sulfide arises when a hydrocarbon fluid, e. g., a $C_4$ fraction from refinery gases, is to be substantially completely desulfurized prior to processing to effect polymerization, alkylation, or the like. An object of this invention, then, is to provide a more complete desulfurization of said hydrocarbons after conventional methods for the removal of hydrogen sulfide and mercaptans have been applied.

Carbonyl sulfide is relatively stable toward acidic reagents, and is only slowly affected by strongly alkaline treating reagents such as solutions of caustic soda and the like. The slow reaction with alkaline reagents is apparently based on the hydrolysis of the compound to form hydrogen sulfide which reacts with the alkaline medium. In view of the relatively slow rate of the hydrolysis reaction, incomplete removal of carbonyl sulfide results in a continuous-type treating system wherein the time of contact of hydrocarbon with treating reagent is relatively short. For example, in washing a propane-butane mixture with a solution of caustic soda to remove hydrogen sulfide, we have found that with caustic solutions of normal strength—say 10 to 20 per cent by weight of sodium hydroxide, only 20 to 30 per cent of the carbonyl sulfide is hydrolyzed and extracted even with multi-stage contacting.

We have now discovered a method of treatment and a reagent which effects complete removal of carbonyl sulfide from hydrocarbon fluids of the type described. Since our reagent effects direct combination of the carbonyl sulfide, the intermediate hydrolysis step is not involved, and reaction is substantially completed upon contact.

We have found that when hydrocarbons containing carbonyl sulfide are brought into contact with solid adsorbent reagents impregnated with primary amines, a reaction takes place to convert the carbonyl sulfide into a compound insoluble in the hydrocarbon stream, said reaction product being retained by the treating reagent. We presume that the mechanism of the reaction first involves the addition of the carbonyl sulfide to the primary amine group according to the xanthogenate reaction, although we do not limit our reagent or our process to such a mechanism. The exact nature of the compound formed is not known, although it is supposed that the reaction initially involves two molecules of amine to one molecule of carbonyl sulfide to form the amine salt of the corresponding substituted monothiocarbonic acid although the ratio may be modified on further spending of the reagents. It is by no means certain that this represents the end product of the reaction, since the initial reaction product may further rearrange to form other compounds.

We have obtained best results in our process through the use of amines which are relatively insoluble in the hydrocarbon fluid being treated as no secondary treatment for amine removal is thereby involved. Thus, while our reaction may be effected by various primary aromatic, cyclic and aliphatic amines, we prefer to use primary alkylol amines and alkylene polyamines. A further advantage of these particular amines is that their boiling points are high enough and their vapor pressures at ordinary temperatures are low enough to enable us to perform gas-phase treating without undue losses of amine from our reagent.

We have further noted that our process is much more efficient when a solid-type reagent is used. Thus, while part of the carbonyl sulfide present in a hydrocarbon gas or liquid may be extracted on contact with an aqueous amine solution, the capacity of such a solution for carbonyl sulfide is far below the theoretical capacity during the relatively short period of complete removal. We obtain much more complete removal of carbonyl sulfide as well as much more efficient reagent life when using our solid-type reagent. This latter effect may be due in part to the greater reagent surface exposed and to the promotion of further reactions involving the amine-carbonyl sulfide addition product on the active surfaces of the carrier material, an effect which obviously would not be obtained in a solution of the amine in the absence of the adsorbent carrier material.

An additional advantage of the use of our solid-type reagent is that ideal counter-current treating conditions are obtained. Thus our reagent is gradually and uniformly spent in the direction of hydrocarbon flow and the reagent in the portion of the bed adjacent to the exit part of the hydrocarbon stream remains in the most active condition to effect the removal of the last traces of carbonyl sulfide. Such a condition is greatly superior to other modes of treating, for example with an aqueous reagent solution the entire volume of which is spent to the same degree.

In our process of filtering or passing the hydrocarbon stream over a solid-type reagent we have the further advantage of prolonged contact time to aid in the completion of the removal reaction. Thus the time of contact of our reagent with the hydrocarbon stream may be controlled as desired and ranges from 12 minutes to two hours at our preferred treating rates, while in processes utilizing aqueous solutions the time of intimate contact of hydrocarbons with solution is ordinarily less than three minutes.

It is known that certain classes of amines mentioned herein will react in aqueous solution with hydrogen sulfide to form unstable salts. Such a reaction, followed by reactivation of the amine solution is the basis of several patented and commercial processes for the removal of hydrogen sulfide from hydrocarbon gases. However, the quantity of hydrogen sulfide present in most hydrocarbon gases is infinitely greater than the quantity of carbonyl sulfide present and for economic reasons we do not contemplate the removal of hydrogen sulfide with our reagent. Instead we prefer to use our reagent and our process to selectively remove carbonyl sulfide from hydrocarbon fluids after conventional methods have been employed for removing hydrogen sulfide. Thus, spending of our reagent with hydrogen sulfide could occur only when very minor amounts of said impurity remain in hydrocarbon fluids to be treated with our process after the major portion of hydrogen sulfide has been removed by conventional means.

In addition, the use of aqueous solutions of the amines disclosed as operative in our process is not feasible for concurrent removal of hydrogen sulfide and carbonyl sulfide from hydrocarbon fluids wherein intermittent or continuous regeneration of the amine solution is practiced. This is due to the fact that the reaction of carbonyl sulfide with amine solutions of the type disclosed herein results in the formation of stable compounds by complex rearrangement so that the amine cannot be recovered by regeneration or revivification procedures. This constant weakening of the amine solution continues until incomplete absorption of hydrogen sulfide results. Thus the presence of carbonyl sulfide in gases being stripped of hydrogen sulfide by solutions containing primary amines causes serious operating difficulties and greatly increased costs. In such cases primary amine solutions are replaced with solutions of secondary and/or tertiary amines which are not reactive toward carbonyl sulfide.

Our reagent may be prepared by impregnating an adsorbent carrier material with amine or a concentrated amine solution. The adsorbent material in a substantially dry condition may be sprayed with the amine, which it adsorbs and immediately appears dry. As carriers we may use the various clay type minerals such as fuller's earth and the like of suitable mesh size. Also, we may use activated alumina, charcoal, silica gel or any of the various adsorbent carriers known to the art. The amount of amine to be applied will depend on the adsorptive power of the carrier, and usually varies between 1 and 20 per cent by weight of the reagent. In general, an excess which may be carried away mechanically by the hydrocarbon stream is avoided for obvious reasons.

As examples of amines which may be used in preparing our reagents we may list amyl amine, cyclohexyl amine, benzyl amine, monoethanolamine, diaminoisopropanol, diethylene triamine, and triethylene tetramine. Numerous other amines which fulfill the terms of our process might be mentioned within the classification outlined. Morpholine and its homologues are such compounds. However, as noted above we prefer to use those amines which are relatively oil-insoluble and are likewise relatively non-volatile at treating temperatures, so that both the amine and the reaction product thereof are retained on the absorbent surface of the carrier substance. Further, the lower diamines, such as ethylene diamine, are more or less unstable and hydrolyze to produce ammonia. But if contamination of the hydrocarbon with amine or with ammonia is not detrimental or is taken care of in subsequent processing steps, the above-mentioned qualifications may be waived.

The various secondary and tertiary amines in the classifications noted above and including diethanolamine and triethanolamine have been found non-reactive toward carbonyl sulfide, and are thus not suitable for our process.

The following examples will serve to illustrate some methods of preparing our reagent and the use of said reagent in treating hydrocarbons.

*Example I*

Activated alumina of 8–20 mesh size was sprayed with monoethanolamine in quantity sufficient to result in a reagent which was 10 per cent by weight of monoethanolamine. The reagent was placed in a tower, and liquid propane containing 0.04 per cent by weight of carbonyl sulfide was passed over the reagent at a flow rate of one liquid volume of propane per hour per volume of reagent. The treated propane was free of carbonyl sulfide and remained so until approximately the theoretical weight of carbonyl sulfide had been extracted by the amine.

*Example II*

Attapulgus clay was impregnated with an aqueous solution containing 90 per cent by volume of triethylene tetramine. The solution was added in a quantity to provide 10 per cent by weight of the reagent.

Liquid butane containing 0.10 per cent by weight of carbonyl sulfide was passed over this reagent at a flow rate of one liquid volume per hour per volume of reagent. The treated butane was free of carbonyl sulfide.

*Example III*

Gases from thermal cracking operations at a refinery were compressed and liquefied and fractionated to produce a material consisting of 20 per cent propane and 80 per cent butane. This liquid hydrocarbon was treated for the removal of hydrogen sulfide and mercaptans, after which it was found to contain 0.002 per cent by weight of carbonyl sulfide. The liquid was passed over a reagent similar to that described in Example I at a flow rate of two volumes per hour per volume of catalyst. The effluent liquid showed free of carbonyl sulfide by very sensitive analytical test methods.

Although our process may be operated with the hydrocarbon material in either liquid or vapor phase, we usually prefer to treat in liquid phase, because the volume of reagent required for nominal flow rates, say 0.5 to 5 volumes per hour per volume of reagent is not excessive. However, when allowance is made in the size of the reagent bed for proper contact time, gaseous hydrocarbons may be satisfactorily treated.

The pressures at which our process operates may depend on the nature of the material being treated. Thus in treating propane and butane in liquid phase, sufficient pressure is provided to avoid vaporization. Pressures in excess of these requirements are of no particular benefit.

The temperatures of treatment using our process are ordinary atmospheric temperatures between 30° and 110° F. Higher temperatures only increase the pressure requirements for equipment used in liquid phase treating of low-boiling hydrocarbons.

We claim:

1. The process for removing carbonyl sulfide from liquefied petroleum gases containing same which comprises passing said fluids subsequent to the removal of hydrogen sulfide over a reagent comprising a solid adsorbent material impregnated with a primary amine.

2. The process for removing carbonyl sulfide from low-boiling hydrocarbon fluids containing same which comprises passing said fluids subsequent to the removal of hydrogen sulfide over a reagent comprising a solid adsorbent material impregnated with a primary amine which is insoluble in the hydrocarbon fluid.

3. In the process of substantially completely desulfurizing low-boiling hydrocarbon fluids at ordinary low temperatures and pressures, the step of passing said fluids subsequent to the removal of hydrogen sulfide therefrom over a reagent comprising an adsorbent carrier material impregnated with an amine containing at least one primary amine grouping.

4. In the process of substantially completely desulfurizing low-boiling hydrocarbon fluids at ordinary low temperatures and pressures, the step of passing said fluids subsequent to the removal of hydrogen sulfide therefrom over a reagent comprising an adsorbent carrier material impregnated with an alkylene polyamine.

5. The process of removing carbonyl sulfide from low-boiling hydrocarbon liquids containing same which comprises passing said liquids over a solid adsorbent reagent impregnated with monoethanolamine.

6. The process of removing carbonyl sulfide from low-boiling hydrocarbon liquids containing same which comprises passing said liquids over a solid adsorbent reagent impregnated with triethylene tetramine.

7. The process for the removal of carbonyl sulfide from hydrogen sulfide-free low-boiling hydrocarbon fluids containing same which comprises contacting said fluids with a reagent consisting of activated alumina impregnated with monoethanolamine.

WALTER A. SCHULZE.
GRAHAM H. SHORT.